US010953881B2

(12) United States Patent
Ma et al.

(10) Patent No.: US 10,953,881 B2
(45) Date of Patent: Mar. 23, 2021

(54) SYSTEM AND METHOD FOR AUTOMATED LANE CHANGE CONTROL FOR AUTONOMOUS VEHICLES

(71) Applicant: TuSimple, Inc., San Diego, CA (US)

(72) Inventors: Kai-Chieh Ma, San Diego, CA (US); Xing Sun, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 271 days.

(21) Appl. No.: 15/946,195

(22) Filed: Apr. 5, 2018

(65) Prior Publication Data

US 2019/0071093 A1    Mar. 7, 2019

Related U.S. Application Data

(63) Continuation-in-part of application No. 15/805,983, filed on Nov. 7, 2017, which is a continuation-in-part
(Continued)

(51) Int. Cl.
*B60W 30/18* (2012.01)
*G05D 1/02* (2020.01)
(Continued)

(52) U.S. Cl.
CPC ... *B60W 30/18163* (2013.01); *B62D 15/0255* (2013.01); *G05D 1/0214* (2013.01);
(Continued)

(58) Field of Classification Search
CPC ....... B60W 30/18163; B60W 2554/00; B60W 2554/80; B60W 2556/60; B60W 2720/24;
(Continued)

(56) References Cited

U.S. PATENT DOCUMENTS 6,084,870 A    7/2000    Wooten et al.
6,263,088 B1   7/2001    Crabtree et al.
(Continued)

FOREIGN PATENT DOCUMENTS

CN    106340197 A    1/2017
CN    106781591 A    5/2017
(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.
(Continued)

*Primary Examiner* — Nicholas Kiswanto
(74) *Attorney, Agent, or Firm* — Paul Liu; Julie J. Muyco; Perkins Coie, LLP

(57) ABSTRACT

A system and method for automated lane change control for autonomous vehicles are disclosed. A particular embodiment is configured to: receive perception data associated with a host vehicle; use the perception data to determine a state of the host vehicle and a state of proximate vehicles detected near to the host vehicle; determine a first target position within a safety zone between proximate vehicles detected in a roadway lane adjacent to a lane in which the host vehicle is positioned; determine a second target position in the lane in which the host vehicle is positioned; and generate a lane change trajectory to direct the host vehicle toward the first target position in the adjacent lane after directing the host vehicle toward the second target position in the lane in which the host vehicle is positioned.

20 Claims, 6 Drawing Sheets

Related U.S. Application Data of application No. 15/698,607, filed on Sep. 7, 2017, now Pat. No. 10,649,458.

(51) Int. Cl.
  *G08G 1/16* (2006.01)
  *B62D 15/02* (2006.01)

(52) U.S. Cl.
  CPC ......... *G08G 1/167* (2013.01); *B60W 2554/00* (2020.02); *B60W 2554/80* (2020.02); *B60W 2556/60* (2020.02); *B60W 2720/24* (2013.01); *G05D 1/024* (2013.01); *G05D 1/027* (2013.01); *G05D 1/0246* (2013.01); *G05D 1/0257* (2013.01); *G05D 1/0278* (2013.01); *G05D 2201/0213* (2013.01)

(58) Field of Classification Search
  CPC .... G05D 1/024; G05D 1/0246; G05D 1/0257; G05D 1/027; G05D 1/0278; G05D 2201/0213
  See application file for complete search history.

(56) References Cited

U.S. PATENT DOCUMENTS

| | | | |
|---|---|---|---|
| 6,594,821 | B1 | 7/2003 | Banning et al. |
| 6,777,904 | B1 | 8/2004 | Degner |
| 6,791,471 | B2 * | 9/2004 | Wehner .................. G08G 1/163 340/903 |
| 6,975,923 | B2 | 12/2005 | Spriggs |
| 7,103,460 | B1 | 9/2006 | Breed |
| 7,689,559 | B2 | 3/2010 | Canright |
| 7,742,841 | B2 | 6/2010 | Sakai et al. |
| 7,783,403 | B2 | 8/2010 | Breed |
| 7,844,595 | B2 | 11/2010 | Canright |
| 8,041,111 | B1 | 10/2011 | Wilensky |
| 8,064,643 | B2 | 11/2011 | Stein |
| 8,082,101 | B2 | 12/2011 | Stein |
| 8,164,628 | B2 | 4/2012 | Stein |
| 8,175,376 | B2 | 5/2012 | Marchesotti |
| 8,265,850 | B2 * | 9/2012 | Shin .................... B60W 10/184 701/93 |
| 8,271,871 | B2 | 9/2012 | Marchesotti |
| 8,346,480 | B2 | 1/2013 | Trepagnier et al. |
| 8,378,851 | B2 | 2/2013 | Stein |
| 8,392,117 | B2 | 3/2013 | Dolgov |
| 8,401,292 | B2 | 3/2013 | Park |
| 8,412,449 | B2 | 4/2013 | Trepagnier |
| 8,428,820 | B2 * | 4/2013 | Ottenhues .......... B62D 15/0285 701/41 |
| 8,436,880 | B2 | 5/2013 | Matsushima et al. |
| 8,478,072 | B2 | 7/2013 | Aisaka |
| 8,553,088 | B2 | 10/2013 | Stein |
| 8,706,394 | B2 | 4/2014 | Trepagnier et al. |
| 8,718,861 | B1 | 5/2014 | Montemerlo et al. |
| 8,788,134 | B1 * | 7/2014 | Litkouhi ............... B60W 30/16 701/23 |
| 8,908,041 | B2 | 12/2014 | Stein |
| 8,917,169 | B2 | 12/2014 | Schofield |
| 8,963,913 | B2 | 2/2015 | Baek |
| 8,965,621 | B1 | 2/2015 | Urmson |
| 8,981,966 | B2 | 3/2015 | Stein |
| 8,983,708 | B2 | 3/2015 | Choe et al. |
| 8,993,951 | B2 | 3/2015 | Schofield |
| 9,002,632 | B1 | 4/2015 | Emigh |
| 9,008,369 | B2 | 4/2015 | Schofield |
| 9,025,880 | B2 | 5/2015 | Perazzi |
| 9,042,648 | B2 | 5/2015 | Wang |
| 9,081,385 | B1 | 7/2015 | Ferguson et al. |
| 9,088,744 | B2 | 7/2015 | Grauer et al. |
| 9,111,444 | B2 | 8/2015 | Kaganovich |
| 9,117,133 | B2 | 8/2015 | Barnes |
| 9,118,816 | B2 | 8/2015 | Stein |
| 9,120,485 | B1 | 9/2015 | Dolgov |
| 9,122,954 | B2 | 9/2015 | Srebnik |
| 9,134,402 | B2 | 9/2015 | Sebastian |
| 9,145,116 | B2 | 9/2015 | Clarke |
| 9,147,255 | B1 | 9/2015 | Zhang |
| 9,156,473 | B2 | 10/2015 | Clarke |
| 9,176,006 | B2 | 11/2015 | Stein |
| 9,179,072 | B2 | 11/2015 | Stein |
| 9,183,447 | B1 | 11/2015 | Gdalyahu |
| 9,185,360 | B2 | 11/2015 | Stein |
| 9,191,634 | B2 | 11/2015 | Schofield |
| 9,214,084 | B2 | 12/2015 | Grauer et al. |
| 9,219,873 | B2 | 12/2015 | Grauer et al. |
| 9,233,659 | B2 | 1/2016 | Rosenbaum |
| 9,233,688 | B2 | 1/2016 | Clarke |
| 9,248,832 | B2 | 2/2016 | Huberman |
| 9,248,834 | B1 | 2/2016 | Ferguson et al. |
| 9,248,835 | B2 | 2/2016 | Tanzmeister |
| 9,251,708 | B2 | 2/2016 | Rosenbaum |
| 9,277,132 | B2 | 3/2016 | Berberian |
| 9,280,711 | B2 | 3/2016 | Stein |
| 9,282,144 | B2 | 3/2016 | Tebay et al. |
| 9,286,522 | B2 | 3/2016 | Stein |
| 9,297,641 | B2 | 3/2016 | Stein |
| 9,299,004 | B2 | 3/2016 | Lin |
| 9,315,192 | B1 | 4/2016 | Zhu |
| 9,317,033 | B2 | 4/2016 | Ibanez-guzman |
| 9,317,776 | B1 | 4/2016 | Honda |
| 9,330,334 | B2 | 5/2016 | Lin |
| 9,342,074 | B2 | 5/2016 | Dolgov |
| 9,347,779 | B1 | 5/2016 | Lynch |
| 9,355,635 | B2 | 5/2016 | Gao |
| 9,365,214 | B2 | 6/2016 | Ben Shalom |
| 9,399,397 | B2 | 7/2016 | Mizutani |
| 9,418,549 | B2 | 8/2016 | Kang et al. |
| 9,428,192 | B2 | 8/2016 | Schofield |
| 9,436,880 | B2 | 9/2016 | Bos |
| 9,438,878 | B2 | 9/2016 | Niebla |
| 9,443,163 | B2 | 9/2016 | Springer |
| 9,446,765 | B2 | 9/2016 | Ben Shalom |
| 9,459,515 | B2 | 10/2016 | Stein |
| 9,466,006 | B2 | 10/2016 | Duan |
| 9,476,970 | B1 | 10/2016 | Fairfield |
| 9,483,839 | B1 | 11/2016 | Kwon et al. |
| 9,490,064 | B2 | 11/2016 | Hirosawa |
| 9,494,935 | B2 | 11/2016 | Okumura et al. |
| 9,507,346 | B1 | 11/2016 | Levinson et al. |
| 9,513,634 | B2 | 12/2016 | Pack et al. |
| 9,531,966 | B2 | 12/2016 | Stein |
| 9,535,423 | B1 | 1/2017 | Debreczeni |
| 9,538,113 | B2 | 1/2017 | Grauer et al. |
| 9,547,985 | B2 | 1/2017 | Tuukkanen |
| 9,549,158 | B2 | 1/2017 | Grauer et al. |
| 9,555,803 | B2 | 1/2017 | Pawlicki |
| 9,568,915 | B1 | 2/2017 | Berntorp |
| 9,587,952 | B1 | 3/2017 | Slusar |
| 9,599,712 | B2 | 3/2017 | Van Der Tempel et al. |
| 9,600,889 | B2 | 3/2017 | Boisson et al. |
| 9,602,807 | B2 | 3/2017 | Crane et al. |
| 9,612,123 | B1 | 4/2017 | Levinson et al. |
| 9,620,010 | B2 | 4/2017 | Grauer et al. |
| 9,625,569 | B2 | 4/2017 | Lange |
| 9,628,565 | B2 | 4/2017 | Stenneth et al. |
| 9,632,502 | B1 * | 4/2017 | Levinson ............... G01S 17/87 |
| 9,649,999 | B1 | 5/2017 | Amireddy et al. |
| 9,652,860 | B1 | 5/2017 | Maali et al. |
| 9,669,827 | B1 | 6/2017 | Ferguson et al. |
| 9,672,446 | B1 | 6/2017 | Vallespi-Gonzalez |
| 9,672,734 | B1 | 6/2017 | Ratnasingam |
| 9,690,290 | B2 | 6/2017 | Prokhorov |
| 9,691,286 | B2 | 6/2017 | Bahrami et al. |
| 9,701,023 | B2 | 7/2017 | Zhang et al. |
| 9,712,754 | B2 | 7/2017 | Grauer et al. |
| 9,718,466 | B2 * | 8/2017 | Kim ..................... G05D 1/0246 |
| 9,720,418 | B2 | 8/2017 | Stenneth |
| 9,723,097 | B2 | 8/2017 | Harris |
| 9,723,099 | B2 | 8/2017 | Chen |
| 9,723,233 | B2 | 8/2017 | Grauer et al. |
| 9,726,754 | B2 | 8/2017 | Massanell et al. |

(56) References Cited

U.S. PATENT DOCUMENTS

| | | |
|---|---|---|
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,145 B2 * | 10/2017 | Gordon ............ B60W 40/04 |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 9,953,236 B1 | 4/2018 | Huang et al. |
| 10,019,011 B1 | 7/2018 | Green et al. |
| 10,037,699 B1 | 7/2018 | Toyoda et al. |
| 10,133,275 B1 | 11/2018 | Kobilarov et al. |
| 10,147,193 B2 | 12/2018 | Huang et al. |
| 10,223,806 B1 | 3/2019 | Luo et al. |
| 10,223,807 B1 | 3/2019 | Luo et al. |
| 10,268,200 B2 | 4/2019 | Fang et al. |
| 10,410,055 B2 | 9/2019 | Wang et al. |
| 10,449,962 B2 * | 10/2019 | Saigusa ............ B60W 50/04 |
| 2003/0114980 A1 | 6/2003 | Klausner et al. |
| 2003/0174773 A1 | 9/2003 | Comaniciu et al. |
| 2007/0183661 A1 | 8/2007 | El-Maleh et al. |
| 2007/0183662 A1 | 8/2007 | Wang et al. |
| 2007/0230792 A1 | 10/2007 | Shashua |
| 2007/0286526 A1 | 12/2007 | Abousleman et al. |
| 2008/0249667 A1 | 10/2008 | Horvitz |
| 2009/0040054 A1 | 2/2009 | Wang |
| 2009/0087029 A1 | 4/2009 | Coleman et al. |
| 2010/0049397 A1 | 2/2010 | Lin |
| 2010/0111417 A1 | 5/2010 | Ward et al. |
| 2010/0226564 A1 | 9/2010 | Marchesotti |
| 2010/0256836 A1 * | 10/2010 | Mudalige ............ G08G 1/164 701/2 |
| 2010/0281361 A1 | 11/2010 | Marchesotti |
| 2011/0071731 A1 | 3/2011 | Eidehall et al. |
| 2011/0142283 A1 | 6/2011 | Huang et al. |
| 2011/0190972 A1 * | 8/2011 | Timmons ............ G08G 1/166 701/31.4 |
| 2011/0206282 A1 | 8/2011 | Aisaka |
| 2011/0247031 A1 | 10/2011 | Jacoby |
| 2012/0041636 A1 | 2/2012 | Johnson et al. |
| 2012/0105639 A1 | 5/2012 | Stein |
| 2012/0140076 A1 | 6/2012 | Rosenbaum |
| 2012/0274629 A1 | 11/2012 | Baek |
| 2012/0314070 A1 | 12/2012 | Zhang et al. |
| 2013/0051613 A1 | 2/2013 | Bobbitt et al. |
| 2013/0083959 A1 | 4/2013 | Owechko et al. |
| 2013/0182134 A1 | 7/2013 | Grundmann et al. |
| 2013/0204465 A1 | 8/2013 | Phillips et al. |
| 2013/0266187 A1 | 10/2013 | Bulan et al. |
| 2013/0329052 A1 | 12/2013 | Chew |
| 2014/0072170 A1 | 3/2014 | Zhang et al. |
| 2014/0104051 A1 | 4/2014 | Breed |
| 2014/0142799 A1 | 5/2014 | Ferguson et al. |
| 2014/0143839 A1 | 5/2014 | Ricci |
| 2014/0145516 A1 | 5/2014 | Hirosawa |
| 2014/0198184 A1 | 7/2014 | Stein |
| 2014/0207325 A1 * | 7/2014 | Mudalige ............ G05D 1/0212 701/26 |
| 2014/0253722 A1 | 9/2014 | Smyth |
| 2014/0321704 A1 | 10/2014 | Partis |
| 2014/0334668 A1 | 11/2014 | Saund |
| 2015/0046060 A1 | 2/2015 | Nikovski et al. |
| 2015/0062304 A1 | 3/2015 | Stein |
| 2015/0266390 A1 | 9/2015 | Shin et al. |
| 2015/0310370 A1 | 10/2015 | Burry et al. |
| 2015/0353082 A1 | 12/2015 | Lee |
| 2016/0026787 A1 | 1/2016 | Nairn et al. |
| 2016/0037064 A1 | 2/2016 | Stein |
| 2016/0094774 A1 | 3/2016 | Li |
| 2016/0118080 A1 | 4/2016 | Chen |
| 2016/0129907 A1 | 5/2016 | Kim |
| 2016/0165157 A1 | 6/2016 | Stein |
| 2016/0210528 A1 | 7/2016 | Duan |
| 2016/0275766 A1 | 9/2016 | Venetianer et al. |
| 2016/0314687 A1 | 10/2016 | Koshizen |
| 2016/0321381 A1 | 11/2016 | English |
| 2016/0334230 A1 | 11/2016 | Ross et al. |
| 2016/0342837 A1 | 11/2016 | Hong et al. |
| 2016/0347322 A1 | 12/2016 | Clarke et al. |
| 2016/0375907 A1 | 12/2016 | Erban |
| 2017/0053169 A1 | 2/2017 | Cuban et al. |
| 2017/0120926 A1 | 5/2017 | Yoon |
| 2017/0124476 A1 | 5/2017 | Levinson et al. |
| 2017/0134631 A1 | 5/2017 | Zhao et al. |
| 2017/0177951 A1 | 6/2017 | Yang et al. |
| 2017/0210378 A1 | 7/2017 | Gunaratne |
| 2017/0248960 A1 | 8/2017 | Shashua et al. |
| 2017/0301104 A1 | 10/2017 | Qian et al. |
| 2017/0305423 A1 | 10/2017 | Green |
| 2018/0151063 A1 | 5/2018 | Pun et al. |
| 2018/0158197 A1 | 6/2018 | Dasgupta et al. |
| 2018/0260956 A1 | 9/2018 | Huang et al. |
| 2018/0283892 A1 | 10/2018 | Behrendt et al. |
| 2018/0286258 A1 | 10/2018 | Derbanne |
| 2018/0341269 A1 * | 11/2018 | Lv ............ G01C 21/3407 |
| 2018/0373980 A1 | 12/2018 | Huval |
| 2019/0025841 A1 | 1/2019 | Haynes et al. |
| 2019/0025853 A1 | 1/2019 | Julian et al. |
| 2019/0034794 A1 | 1/2019 | Ogale et al. |
| 2019/0049987 A1 | 2/2019 | Djuric et al. |
| 2019/0065863 A1 | 2/2019 | Luo et al. |
| 2019/0066329 A1 | 2/2019 | Luo et al. |
| 2019/0066330 A1 | 2/2019 | Luo et al. |
| 2019/0072965 A1 | 3/2019 | Zhang et al. |
| 2019/0072966 A1 | 3/2019 | Zhang et al. |
| 2019/0072973 A1 | 3/2019 | Sun et al. |
| 2019/0079526 A1 | 3/2019 | Vallespi-Gonzalez et al. |
| 2019/0108384 A1 | 4/2019 | Wang et al. |
| 2019/0129436 A1 | 5/2019 | Sun et al. |
| 2019/0132391 A1 | 5/2019 | Thomas et al. |
| 2019/0132392 A1 | 5/2019 | Liu et al. |
| 2019/0210564 A1 | 7/2019 | Han et al. |
| 2019/0210613 A1 | 7/2019 | Sun et al. |
| 2019/0236950 A1 | 8/2019 | Li et al. |
| 2019/0266420 A1 | 8/2019 | Ge et al. |
| 2019/0325325 A1 | 10/2019 | Monteil et al. |

FOREIGN PATENT DOCUMENTS

| | | |
|---|---|---|
| CN | 108010360 A | 5/2018 |
| DE | 2608513 A1 | 9/1977 |
| EP | 1754179 A1 | 2/2007 |
| EP | -2448251 A2 | 5/2012 |
| EP | 2448251 A2 | 5/2012 |
| EP | 2463843 A2 | 6/2012 |
| EP | -2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | -2993654 A1 | 3/2016 |
| EP | 2993654 A1 | 3/2016 |
| EP | -3081419 A1 | 10/2016 |
| EP | 3081419 A1 | 10/2016 |
| KR | -100802511 B1 | 2/2008 |
| KR | 100802511 B1 | 2/2008 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | -2014111814 A2 | 7/2014 |
| WO | WO/2014/111814 A2 | 7/2014 |
| WO | WO/2014/111814 A3 | 7/2014 |

(56) References Cited

FOREIGN PATENT DOCUMENTS

| WO | 2014166245 A1 | 10/2014 |
|---|---|---|
| WO | WO/2014/201324 | 12/2014 |
| WO | WO/2015/083009 | 6/2015 |
| WO | WO/2015/103159 A1 | 7/2015 |
| WO | -2015125022 A2 | 8/2015 |
| WO | WO/2015/125022 | 8/2015 |
| WO | -2015186002 A2 | 12/2015 |
| WO | WO/2015/186002 A2 | 12/2015 |
| WO | WO/2015/186002 A3 | 12/2015 |
| WO | 2016090282 A1 | 6/2016 |
| WO | -2016135736 A2 | 9/2016 |
| WO | WO/2016/135736 | 9/2016 |
| WO | WO/2017/013875 A1 | 1/2017 |
| WO | 2017079349 A1 | 5/2017 |
| WO | -2017079349 A1 | 5/2017 |
| WO | -2017079460 A2 | 5/2017 |
| WO | 2017120336 A2 | 7/2017 |
| WO | 2019040800 A1 | 2/2019 |
| WO | 2019060927 A2 | 3/2019 |
| WO | 2019084491 A1 | 5/2019 |
| WO | 2019084494 A1 | 5/2019 |
| WO | 2019140277 A2 | 7/2019 |
| WO | 2019168986 A1 | 9/2019 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.

Li, Yanghao and Wang, Naiyan and Liu, Jiaying and Hou, Xiaodi, "Demystifying Neural Style Transfer", arXiv preprint arXiv:1701.01036, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

Li, Yanghao and Wang, Naiyan and Liu, Jiaying and Hou, Xiaodi, "Factorized Bilinear Models for Image Recognition", arXiv preprint arXiv:1611.05709, 2016.

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineenng, Center for Environmental Research and Technology, University of California, Riverside, CA 92521, date anknown.

Kyoungho Ahn, Hesham Rakha, "The Effects of Route Choice Decisions on Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Tian Li, "Proposal Free Instance Segmentation Based on Instance-aware Metric", Department of Computer Science, Cranberry-Lemon University, Pittsburgh, PA., date unknown.

Mohammad Norouzi, David J. Fleet, Ruslan Salakhutdinov, "Hamming Distance Metric Learning", Departments of Computer Science and Statistics, University of Toronto, date unknown.

Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.

Kendall, Alex, Gal, Yarin, "What Uncertainties Do We Need in Bayesian Deep Learning for Computer Vision", arXiv:1703.04977v1 [cs.CV] Mar. 15, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.

Peter Welinder, Steve Branson, Serge Belongie, Pietro Perona, "The Multidimensional Wisdom of Crowds"; http://www.vision.caltech.edu/visipedia/papers/WelinderEtaINIPS10.pdf, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.

(56) References Cited

OTHER PUBLICATIONS

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.
International Preliminary Report on Patentability, International Application No. PCT/2018/059689, dated Mar. 10, 2020., Mar. 10, 2020.
PCT International Search Report and Written Opinion, International Application No. PCT/US2018/059689, dated Apr. 24, 2019., Apr. 24, 2019.
Hou, Xiaodi, "Computational Modeling and Psychophysics in Low and Mid-Level Vision", California Institute of Technology, 2014.

\* cited by examiner

SYSTEM AND METHOD FOR AUTOMATED LANE CHANGE CONTROL FOR AUTONOMOUS VEHICLES

PRIORITY PATENT APPLICATIONS

This is a continuation-in-part (CIP) patent application drawing priority from U.S. non-provisional patent application Ser. No. 15/805,983, filed Nov. 7, 2017; which is a CIP patent application drawing priority from U.S. non-provisional patent application Ser. No. 15/698,607, filed Sep. 7, 2017. This present non-provisional CIP patent application draws priority from the referenced patent applications. The entire disclosure of the referenced patent applications is considered part of the disclosure of the present application and is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2018, TuSimple, All Rights Reserved.

TECHNICAL FIELD

This patent document pertains generally to tools (systems, apparatuses, methodologies, computer program products, etc.) for trajectory planning, lane change planning and control, vehicle control systems, and autonomous driving systems, and more particularly, but not by way of limitation, to a system and method for automated lane change control for autonomous vehicles.

BACKGROUND

An autonomous vehicle is often configured to follow a trajectory based on a computed driving path. However, when variables such as obstacles are present on the driving path, the autonomous vehicle must perform control operations so that the vehicle may be safely driven by changing the driving path to avoid the obstacles.

In the related art, autonomous vehicle control operations have been determined by representing spatial information (e.g., a coordinate, a heading angle, a curvature, etc.) of the driving path as a polynomial expression or mathematical function for a movement distance in order to avoid a stationary obstacle. However, when dynamic obstacles are present on the driving path, the autonomous vehicle according to the related art may not accurately predict whether or not the vehicle will collide with the dynamic obstacles. In particular, the related art does not consider the interaction between the autonomous vehicle and other dynamic vehicles. Therefore, conventional autonomous vehicle control systems cannot accurately predict the future positions of other proximate dynamic vehicles. As a result, the optimal behavior of the conventional autonomous vehicle cannot be achieved. For example, the unexpected behavior of a proximate dynamic obstacle may result in a collision with the conventional autonomous vehicle.

The inability of conventional autonomous vehicle control systems to consider the positions, speed, and acceleration of other proximate dynamic vehicles is particularly problematic during autonomous lane changing maneuvers. A safe and comfortable autonomous lane change maneuver cannot be performed without an accurate determination of the status of proximate dynamic vehicles.

SUMMARY

A system and method for automated lane change control for autonomous vehicles is disclosed herein. Specifically, the present disclosure relates to automated lane change control using a system and method that considers the positions, headings, speed, and acceleration of other proximate dynamic vehicles in the vicinity of the autonomously controlled (e.g., host) vehicle. In one aspect, the system herein may include various sensors, configured to collect perception data, a computing device, and a lane change control module for generating a lane change trajectory to enable the host vehicle to execute a safe and comfortable lane change maneuver in the presence of other vehicles and/or dynamic objects in the vicinity of (proximate to) the host autonomous vehicle. Initially, the computing device uses the perception data to determine a current state of the host vehicle and the state of any proximate vehicles detected in the presence of or near to the host vehicle. Using the determined vehicle states of the host vehicle and proximate vehicles, the lane change control module can be configured to use a state prediction model to predict the locations of the vehicles at a given point in time in the future based on the current positions, headings, velocities, and accelerations of the vehicles. The lane change control module can also be configured to define a safety distance around each vehicle based on a pre-configured and modifiable parameter or set of parameters. The safety distance parameters can be used to specify a region around each vehicle into which other vehicles cannot be allowed to encroach. The lane change control module can be further configured to determine a safety zone between proximate vehicles detected in a roadway lane adjacent to a lane in which the host vehicle is currently positioned. The lane change control module can be further configured to determine a first target position within the safety zone. The lane change control module of the host vehicle can also be configured to determine a second target position in the same lane in which the host vehicle is currently positioned. In an example embodiment, the lane change control module can be configured to cause the host vehicle to perform a lane change maneuver in two phases: 1) a longitudinal positioning phase or pre-turn phase to properly position the host vehicle at a second target position in the current lane for execution of a leftward or rightward turning maneuver, and 2) a lateral steering phase during which the host vehicle is controlled to perform a leftward or rightward steering operation to direct the host vehicle from the second target position in the current lane toward the first target position in the adjacent lane. In the longitudinal positioning phase or pre-turn phase, a first phase trajectory can be generated to direct the host vehicle toward the second target position in the current lane. In the lateral steering phase, a second phase trajectory can be generated to direct the host vehicle toward the first target position in the adjacent lane. In the example embodiment, the first phase trajectory and the second phase trajectory can be generally denoted as a lane change trajectory. These two operational phases of the lane change control module of an example embodiment are described in more detail herein.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for automated lane change control for autonomous vehicles are described herein. An example embodiment disclosed herein can be used in the context of an in-vehicle control system 150 in a vehicle ecosystem 101 shown in FIG. 1. In one example embodiment, an in-vehicle control system 150 with a lane change control module 200 resident in a host vehicle 105 can be configured like the architecture and ecosystem 101 illustrated in FIG. 1. However, it will be apparent to those of ordinary skill in the art that the lane change control module 200 described and claimed herein can be implemented, configured, and used in a variety of other applications and systems as well.

Figure 1:
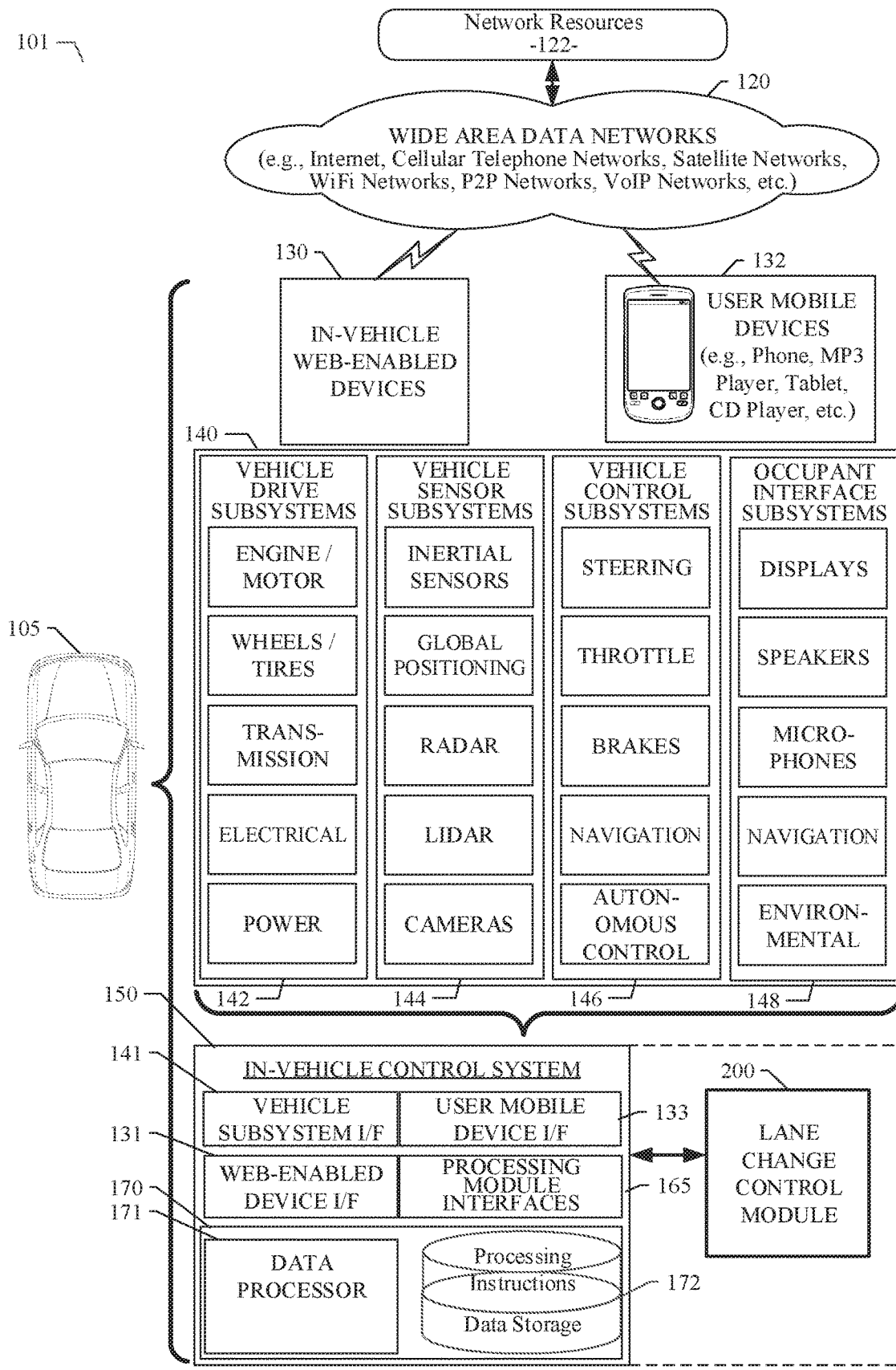
FIG. 1 illustrates a block diagram of an example ecosystem in which a lane change control module of an example embodiment can be implemented.

Referring now to FIG. 1, a block diagram illustrates an example ecosystem 101 in which an in-vehicle control system 150 and a lane change control module 200 of an example embodiment can be implemented. These components are described in more detail below. Ecosystem 101 includes a variety of systems and components that can generate and/or deliver one or more sources of information/data and related services to the in-vehicle control system 150 and the lane change control module 200, which can be installed in the host vehicle 105. For example, a camera installed in the vehicle 105, as one of the devices of vehicle subsystems 140, can generate image and timing data or other perception data that can be received by the in-vehicle control system 150. The in-vehicle control system 150 and an image processing module executing therein can receive this image and timing data input. The image processing module can extract object data from the image and timing data to identify objects in the proximity of the vehicle. As described in more detail below, the lane change control module 200 can process the perception data and generate a lane change trajectory for the host vehicle based on the detected objects. The lane change trajectory can be used by an autonomous vehicle control subsystem, as another one of the subsystems of vehicle subsystems 140. The autonomous vehicle control subsystem, for example, can use the real-time generated lane change trajectory to safely and efficiently navigate the vehicle 105 through a real world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the lane change control module 200 for processing object data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the lane change control module 200. In various example embodiments, a plurality of processing modules, configured similarly to lane change control module 200, can be provided for execution by data processor 171. As shown by the dashed lines in FIG. 1, the lane change control module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing object input or object input analysis.

Antennas can serve to connect the in-vehicle control system 150 and the lane change control module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the lane change control module 200 can receive web-based data or content via an in-vehicle web-enabled device interface 131, which can be used to connect with the in-vehicle web-enabled device receiver 130 and network 120. In this manner, the in-vehicle control system 150 and the lane change control module 200 can support a variety of network-connectable in-vehicle devices and systems from within a vehicle 105.

As shown in FIG. 1, the in-vehicle control system 150 and the lane change control module 200 can also receive data, object processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, object processing control parameters, and content for the in-vehicle control system 150 and the lane change control module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the lane change control module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its context in its environment, determine a predicted behavior of at least one other vehicle in the context of the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the lane change control module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials.

The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information or perception data related to an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an 02 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the lane change control module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the lane change control module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 140, the vehicle sensor subsystem 144, the vehicle control subsystem 146, and the occupant interface subsystems 148.

In addition to the processing instructions, the data storage device 172 may store data such as object processing parameters, perception data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 140, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and follow a path or trajectory generated by the lane change control module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and lane change control module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the lane change control module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the lane change control module 200 can be implemented as in-vehicle components of vehicle 105. In various example embodiments, the in-vehicle control system 150 and the lane change control module 200 in data communication therewith can be implemented as integrated components or as separate components. In an example embodiment, the software components of the in-vehicle control system 150 and/or the lane change control module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

System and Method for Automated Lane Change Control for Autonomous Vehicles

A system and method for automated lane change control for autonomous vehicles is disclosed herein. Specifically, the present disclosure relates to automated lane change control using a system and method that considers the positions, headings, speed, and acceleration of other proximate dynamic vehicles in the vicinity of the autonomously controlled (e.g., host) vehicle. In one aspect, the system herein may include various sensors, configured to collect perception data, a computing device, and a lane change control module for generating a lane change trajectory to enable the host vehicle to execute a safe and comfortable lane change maneuver in the presence of other vehicles and/or dynamic objects in the vicinity of (proximate to) the host autonomous vehicle. Initially, the computing device uses the perception data to determine a current state of the host vehicle and the state of any proximate vehicles detected in the presence of or near to the host vehicle. Using the determined vehicle states of the host vehicle and proximate vehicles, the lane change control module can be configured to use a state prediction model to predict the locations of the vehicles at a given point in time in the future based on the current positions, headings, velocities, and accelerations of the vehicles. The lane change control module can also be configured to define a safety distance around each vehicle based on a pre-configured and modifiable parameter or set of parameters. The safety distance parameters can be used to specify a region around each vehicle into which other vehicles cannot be allowed to encroach. The lane change control module can be further configured to determine a safety zone between proximate vehicles detected in a roadway lane adjacent to a lane in which the host vehicle is currently positioned. The lane change control module can be further configured to determine a first target position within the safety zone. The lane change control module of the host vehicle can also be configured to determine a second target position in the same lane in which the host vehicle is currently positioned. In an example embodiment, the lane change control module can be configured to cause the host vehicle to perform a lane change maneuver in two phases: 1) a longitudinal positioning phase or pre-turn phase to properly position the host vehicle at a second target position in the current lane for execution of a leftward or rightward turning maneuver, and 2) a lateral steering phase during which the host vehicle is controlled to perform a leftward or rightward steering operation to direct the host vehicle from the second target position in the current lane toward the first target position in the adjacent lane. In the longitudinal positioning phase or pre-turn phase, a first phase trajectory can be generated to direct the host vehicle toward the second target position in the current lane. In the lateral steering phase, a second phase trajectory can be generated to direct the host vehicle toward the first target position in the adjacent lane. In the example embodiment, the first phase trajectory and the second phase trajectory can be generally denoted as a lane change trajectory. These two operational phases of the lane change control module of an example embodiment are described in more detail herein.

Figure 2:
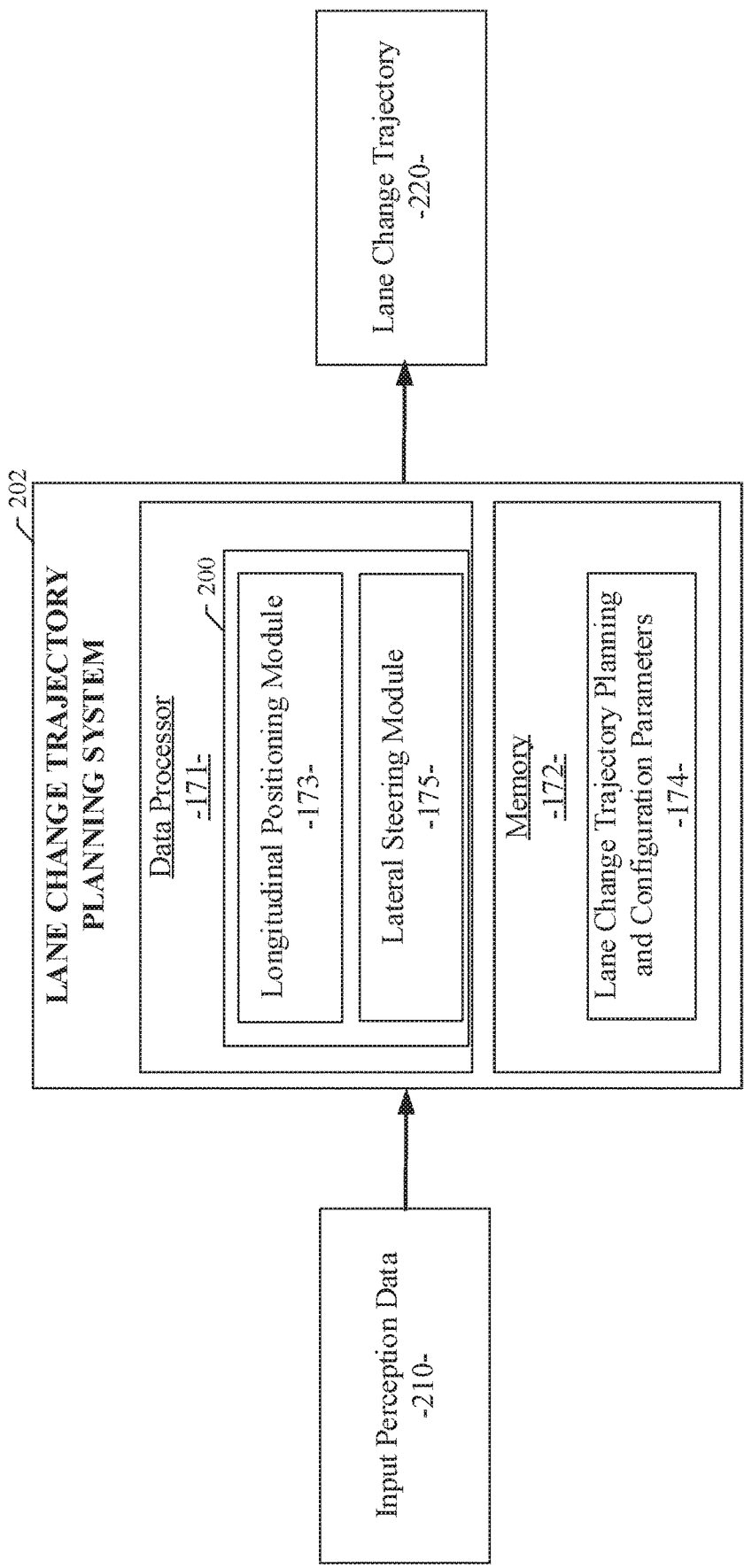
FIG. 2 illustrates an example embodiment of the components of the lane change trajectory planning system and the lane change control module therein.

Referring now to FIG. 2, an example embodiment disclosed herein can be used in the context of a lane change trajectory planning system 202 for autonomous vehicles. In an example embodiment, the lane change trajectory planning system 202 can include a lane change control module 200 (described in more detail below). The lane change trajectory planning system 202 can be configured to include a data processor 171 to execute the lane change control module 200 for processing input perception data 210 received from one or more of the vehicle subsystems 140. The data processor 171 can be combined with a data storage or memory device 172 as part of a computing system 202 in the in-vehicle control system 150. The data storage device 172 can be used to store data 174, such as processing or configuration parameters, lane change trajectory data, data processing instructions, and the like. In various example embodiments, a plurality of processing modules, configured similarly to lane change control module 200, can be provided for execution by data processor 171.

In the example embodiment, the lane change control module 200 can be configured to include a longitudinal positioning module 173 and a lateral steering module 175. As described in more detail below, the longitudinal positioning module 173 serves to enable generation of a first phase trajectory for the host vehicle (e.g., the autonomous vehicle). The lateral steering module 175 serves to enable generation of a second phase trajectory for the host vehicle. Collectively, the longitudinal positioning module 173 and the lateral steering module 175 can generate the first phase trajectory and the second phase trajectory, which can be generally denoted as the lane change trajectory 220 provided as an output from the lane change control module 200. The lane change trajectory 220 can be generated based on input perception data 210 received from one or more of the vehicle sensor subsystems 144, including one or more cameras, and processed by an image processing module to identify proximate agents (e.g., moving vehicles, dynamic objects, or other objects in the proximate vicinity of the host vehicle). The longitudinal positioning module 173 and the lateral steering module 175 can be configured as software modules executed by the data processor 171 of the lane change trajectory planning system 202. The modules 173 and 175 of the lane change control module 200 can receive the input perception data 210 and produce a lane change trajectory 220, which can be used by the autonomous control subsystem of the vehicle control subsystem 146 to more efficiently and safely control the host vehicle 105 during a lane change maneuver. As part of their lane change trajectory planning processing, the longitudinal positioning module 173 and the lateral steering module 175 can be configured to work with lane change trajectory planning and configuration parameters 174, which can be used to customize and fine tune the operation of the lane change control module 200. The trajectory planning and configuration parameters 174 can be stored in a memory 172 of the lane change trajectory planning system 202.

Referring again to FIG. 2, the lane change control module 200, and the longitudinal positioning module 173 and lateral steering module 175 therein, can receive input perception data 210 from one or more of the vehicle sensor subsystems 144, including one or more cameras. The image data from the vehicle sensor subsystems 144 can be processed by an image processing module to identify proximate agents or other objects (e.g., moving vehicles, dynamic objects, or other objects in the proximate vicinity of the vehicle 105). The process of semantic segmentation can be used for this purpose. The information related to the identified proximate agents or other detected objects can be received by the lane change control module 200 as input perception data 210. The input perception data 210 can include a plurality of perception data including perception data or images from an array of perception information gathering devices or sensors that may include image generating devices (e.g., cameras), light amplification by stimulated emission of radiation (laser) devices, light detection and ranging (LIDAR) devices, global positioning system (GPS) devices, sound navigation and ranging (sonar) devices, radio detection and ranging (radar) devices, and the like. The perception data 210 can include traffic or vehicle image data, roadway data, roadway lane marker data, environmental data, distance data and velocity/acceleration data from LIDAR or radar devices, and other sensor information received from the perception information gathering devices of the host vehicle. The perception data 210 can include data from which a position, heading, velocity, and acceleration (e.g., a vehicle state or status) of neighboring vehicles in the vicinity of or proximate to the autonomous host vehicle can be obtained or calculated. The perception data 210 can also include data from which a position, heading, velocity, and acceleration (e.g., a vehicle state or status) of the host vehicle can be obtained or calculated. As a result, the perception data, vehicle state and context data, and other available information can be obtained, processed, and used to build a perception dataset 210 for input to the lane change trajectory planning system 202. Alternatively, the gathered perception or sensor data 210 can be stored in a memory device of the host vehicle and transferred later to the data processor 171 of the lane change trajectory planning system 202. The perception or sensor data 210, and other related data gathered or calculated by the vehicle sensor subsystems can be used as an input to the lane change trajectory planning system 202 and processed by the lane change control module 200 resident in a vehicle 105, as described in more detail herein.

In the example embodiment as shown in FIG. 2, the lane change control module 200, the longitudinal positioning module 173, and the lateral steering module 175, as well as other processing modules not shown for clarity, can be implemented as software, firmware, or other logic components executing or activated within an executable environment of the lane change control module 200 operating within or in data communication with the in-vehicle control system 150. Each of these modules of an example embodiment is described in more detail below in connection with the figures provided herein.

Figure 3:
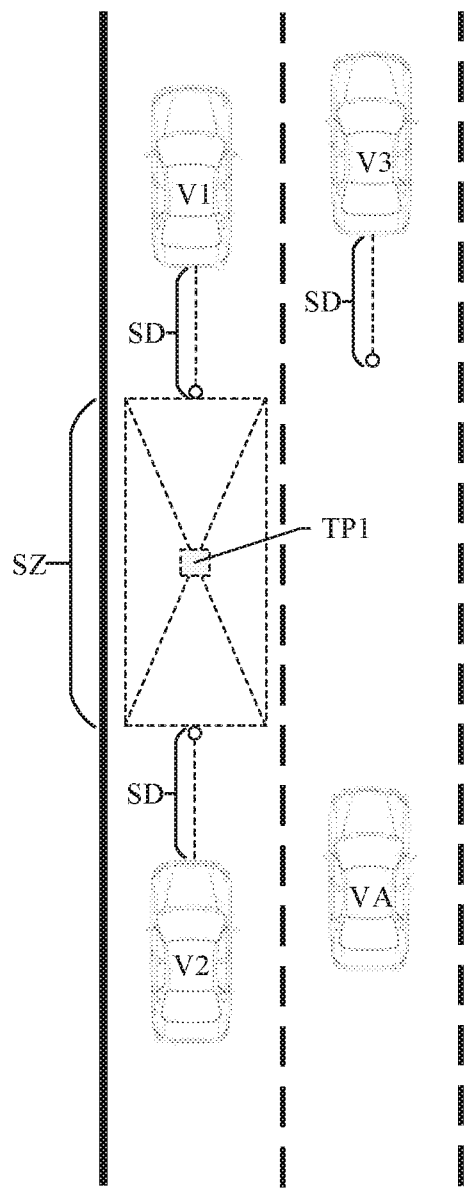
FIGS. 3 and 4 illustrate an example of the processing performed by the system and method of an example embodiment for automated lane change control for autonomous vehicles.
Figure 4:
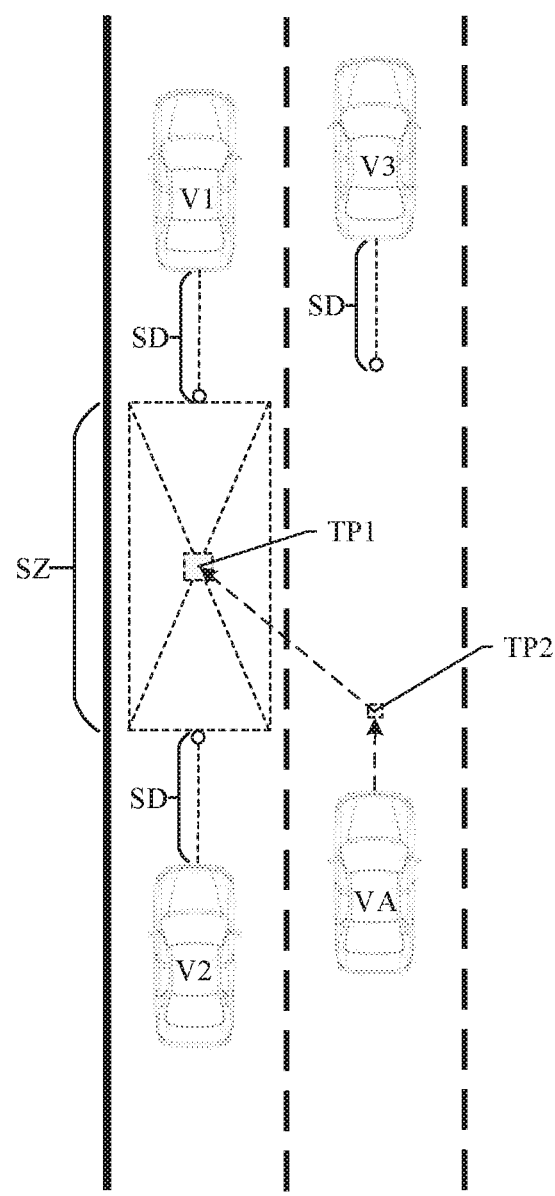

Referring now to FIGS. 3 and 4, an example illustrates the processing performed by the system and method of an example embodiment for automated lane change control for autonomous vehicles. Specifically, the illustrated example relates to automated lane change control using the system and method implemented by an example embodiment of the lane change control module 200 as described above. In particular, the lane change control module 200 of an example embodiment can be configured to obtain and consider the positions, speeds, and accelerations (e.g., the vehicle states or status) of other proximate dynamic vehicles in the vicinity of the autonomously controlled (e.g., host) vehicle. The lane change control module 200 of an example embodiment can also be configured to obtain and consider the position, speed, and acceleration (e.g., the vehicle state or status) of the host vehicle as well. In one aspect as described above, the example embodiment may include various sensors, configured to collect perception data 210, a computing device 171, and the lane change control module 200 for generating a lane change trajectory 220 to enable the host vehicle to execute a safe and comfortable lane change maneuver in the presence of other vehicles and/or dynamic objects in the vicinity of (proximate to) the host autonomous vehicle.

Initially, the example embodiment uses the perception data 210 to determine a current state of the host vehicle and the state of any proximate vehicles detected in the presence of the host vehicle. The vehicle state can include the current position/location and heading of each vehicle and the related derivatives including velocity and acceleration of each vehicle. The derivative of the acceleration or jerk can also be determined for each vehicle. The position/location of a vehicle can be represented as an x,y coordinate, a geographical coordinate (e.g., latitude/longitude), a polar coordinate, or other conventional form of positional representation. The position/location of a vehicle can also be represented relative to the position/location of another detected vehicle or the host vehicle. Similarly, the velocities and/or accelerations can be represented as absolute values or values relative to other vehicle velocities and/or accelerations.

As shown in the example of FIGS. 3 and 4, using the determined vehicle states of the host vehicle VA and proximate vehicles (V1, V2, and V3), the lane change control module 200 can be configured to use a state prediction model to predict the locations of the vehicles at a given point in time in the future based on the current positions, headings, velocities, and accelerations of the vehicles. In one embodiment, the lane change control module 200 can predict the future locations of each of the vehicles based on a linear extrapolation from the current position using the heading, speed, and acceleration of each of the vehicles over a given time period. In another embodiment, the behavior of the proximate vehicles can be predicted using heuristics and/or a trained machine learning model, as described in a related U.S. patent application Ser. No. 15/805,983; filed Nov. 7, 2017, as referenced above. Given the predicted behaviors and related predicted trajectories and/or positions of each of the proximate vehicles, the lane change control module 200 can predict the future positions/locations of each of the vehicles based on the predicted trajectories of the vehicles over the given time period. As a result, the lane change control module 200 can be configured to determine the future positions, headings, velocities, and accelerations of the host vehicle VA and each of the detected proximate vehicles (V1, V2, and V3) at a given point in time.

The lane change control module 200 can also be configured to define a safety distance SD around each vehicle based on a pre-configured and modifiable parameter or set of parameters. The safety distance SD parameters can be common to all vehicles or specific to particular vehicles. The safety distance SD parameters can also be associated with a vehicle in a particular context, such as an accelerating/decelerating vehicle, a vehicle positioned ahead of, adjacent to, or behind the host vehicle VA, a particular type of vehicle, a vehicle operating in a particular weather or environmental condition, or the like. The safety distance SD parameters can be used to specify a region around each vehicle into which other vehicles cannot be allowed to encroach.

Given the future positions, headings, velocities, and accelerations of the host vehicle VA and each of the detected proximate vehicles (V1, V2, and V3) at a given point in time and the safety distance SD parameters associated with each vehicle, the lane change control module 200 can be configured to determine a safety zone SZ between proximate vehicles (V1 and V2) detected in a roadway lane adjacent to a lane in which the host vehicle VA is positioned or operating. The adjacent lane can be a lane to the left or right of the lane in which the host vehicle VA is positioned or operating. The safety zone SZ can be bounded by the safety distance SD from a leading proximate vehicle V1 and the safety distance SD from a following proximate vehicle V2 in the adjacent lane. Techniques are known for automatically detecting the lane boundaries for a current or adjacent lane on a roadway. The safety zone SZ can be defined as a region between lane boundaries in an adjacent lane bounded at one end by the safety distance SD from a leading adjacent proximate vehicle V1 and bounded at the other end by the safety distance SD from a following adjacent proximate vehicle V2. Again, the determined safety zone SZ can associated with an adjacent lane to the left or right of the lane in which the host vehicle VA is positioned or operating.

Once the safety zone SZ between proximate vehicles V1 and V2 detected in a roadway lane adjacent to the host vehicle VA is determined, the lane change control module 200 can be configured to determine a first target position TP1 within the safety zone SZ as shown in FIGS. 3 and 4. In one embodiment, the first target position TP1 can be defined as a center point of the safety zone SZ. In other embodiments, the first target position TP1 can be defined as a point in the safety zone SZ and located relative to the context of the host vehicle VA or the proximate vehicles V1 or V2. In any case, the first target position TP1 corresponds to a location in an adjacent lane to which the host vehicle VA can be directed to accomplish a safe lane change maneuver. Because the first target position TP1 is within the determined safety zone SZ, the first target position TP1 will be sufficiently separated from the positions/locations of the proximate vehicles V1 and V2 detected in the adjacent lane. As described above, the first target position TP1 can be represented as an x,y coordinate, a geographical coordinate (e.g., latitude/longitude), a polar coordinate, or other conventional form of positional representation. The first target position TP1 can also be represented relative to the positions/locations of other detected vehicles V1 or V2 or the host vehicle VA. Given that the proximate vehicles V1 and V2 and the host vehicle VA are constantly moving, the first target position TP1 can be represented in a manner that accommodates the motion of the vehicles.

Having determined the first target position TP1 within the safety zone SZ in an adjacent lane, the lane change control module 200 of the host vehicle VA can be configured to determine a second target position TP2 in the same lane in which the host vehicle VA is currently positioned as shown in FIG. 4. The second target position TP2 is a location in the host vehicle's VA current lane from which the host vehicle VA can begin a leftward or rightward turn maneuver to safely and comfortably merge the host vehicle VA toward the first target position TP1 in the adjacent lane. Once the first and second target positions (TP1 and TP2) are determined as described above, the lane change control module 200 of an example embodiment can generate one or more trajectories to navigate the host vehicle VA into the first target position TP1 in the adjacent lane. In an example embodiment, the lane change control module 200 can cause the host vehicle VA to perform the lane change maneuver in two phases: 1) a longitudinal positioning phase or pre-turn phase to properly position the host vehicle VA in the current lane for execution of a leftward or rightward turning maneuver, and 2) a lateral steering phase during which the host vehicle VA is controlled to perform a leftward or rightward steering operation to direct the host vehicle VA toward the first target position TP1 in the adjacent lane. These two operational phases of the lane change control module 200 are described in more detail below.

In the example embodiment as described above, the lane change control module 200 can be configured to include a longitudinal positioning module 173 and a lateral steering module 175. The longitudinal positioning module 173 serves to enable generation of a first phase trajectory for the host vehicle VA to direct the host vehicle VA from its current position toward the second target position TP2 located in the same lane in which the host vehicle VA is currently positioned. The lateral steering module 175 serves to enable generation of a second phase trajectory for the host vehicle VA to direct the host vehicle VA from the second target position TP2 toward the first target position TP1 located in the safety zone SZ in the lane adjacent to the lane where the host vehicle VA is currently positioned. Collectively, the longitudinal positioning module 173 and the lateral steering module 175 can generate the first phase trajectory and the second phase trajectory, which can be generally denoted as the lane change trajectory 220 provided as an output from the lane change control module 200. In some cases for the first phase (e.g., the longitudinal positioning phase or pre-turn phase) of the lane change maneuver of an example embodiment, the second target position TP2 may be some distance ahead of or behind the current position of the host vehicle VA. In this case, the first phase trajectory can be generated by the longitudinal positioning module 173 of the lane change control module 200 to cause the host vehicle VA to intercept the second target position TP2 in the current lane. The first phase trajectory may include a velocity change command to cause the host vehicle VA to accelerate or decelerate as the host vehicle VA approaches the second target position TP2. In other cases, the second target position TP2 may correspond to the current position of the host vehicle VA. In this case, the host vehicle VA can immediately begin a leftward or rightward turn maneuver to safely and comfortably merge the host vehicle VA toward the first target position TP1 in the adjacent lane. In this case, the first phase trajectory is essentially null.

In the second phase (e.g., the lateral steering phase) of the lane change maneuver of an example embodiment, the host vehicle VA can be controlled by the lateral steering module 175 to initiate a leftward or rightward steering maneuver to cause the host vehicle VA to intercept the first target position TP1 in the adjacent lane from the second target position TP2 in the current lane. In the second phase, a second phase trajectory can be generated by the lateral steering module 175 of the lane change control module 200 to cause the host vehicle VA to intercept the first target position TP1 in the adjacent lane from the second target position TP2. The second phase trajectory is typically initiated once the host vehicle VA reaches the second target position TP2. The second phase trajectory may include a velocity change command to cause the host vehicle VA to accelerate or decelerate as the host vehicle VA approaches the first target position TP1. In various embodiments, the first phase trajectory and the second phase trajectory can be integrated into a single host vehicle VA trajectory or lane change trajectory 220 that guides the host vehicle VA from its current position to intercept the first target position TP1 in the adjacent lane.

In various example embodiments, the lane change control module 200 can use one or more of several methods to generate the first phase trajectory and the second phase trajectory. As described above, the state of the host vehicle VA and the states of the proximate vehicles (V1, V2, and V3) can include the current position/location and heading of each vehicle and the related derivatives including velocity and acceleration of each vehicle. Additionally, an external speed profile of the host vehicle VA can be generated on-the-fly or off-line and retained to model the speed profile or performance characteristics of a particular vehicle when executing a lane change maneuver. The vehicle state information, the host vehicle speed profile information, the first target position TP1 (e.g., the target end position), and the second target position TP2 can be used by the any of the various methods to generate the first phase trajectory and the second phase trajectory as described below.

In one example embodiment, the lane change control module 200 can obtain the vehicle state information, the host vehicle speed profile information, and the first target position TP1 (e.g., the target end position) as described above. In this example embodiment, the lane change control module 200 can generate or fit a Dubin's curve as the trajectory of the host vehicle from its current position to the first target position TP1 (e.g., the target end position) in an adjacent lane. As well known, the term Dubin's curve or path typically refers to the shortest curve that connects two points in the two-dimensional Euclidean plane (i.e., the x-y plane) with a constraint on the curvature of the path and with prescribed initial and terminal tangents to the path, and an assumption that the vehicle traveling the path can only travel forward. Initially, the lane change control module 200 can obtain or determine an initial set of Dubin's parameters (a, t0, t1), where a represents a constraint on the curvature of the path or the minimum turning radius of the Dubin's vehicle, t0 specifies the starting time when the Dubin's curve starts, and t1 specifies the time when the Dubin's curve ends. The initial set of Dubin's parameters can be determined from the vehicle state information, the host vehicle speed profile information, and the target end position. The set of Dubin's parameters provides a level of flexibility for the trajectory generation to avoid collisions and to accommodate various types of vehicles with different profiles.

The lane change control module 200 can begin a loop by fitting a Dubin's curve using a current set of Dubin's parameters (a, t0, t1). The lane change control module 200 can score the Dubin's curve and determine the gradient of the Dubin's curve corresponding to the current set of Dubin's parameters (a, t0, t1). The lane change control module 200 can compare the gradient of the Dubin's curve with the external speed profile of the vehicle to determine if the curvature of the Dubin's path is within the vehicle's profile and if any collision might be detected as a result of the execution of the Dubin's path. If the Dubin's curve fit using the current set of Dubin's parameters is unacceptable because of the score or gradient, the lane change control module 200 can update the set of Dubin's parameters according to the previous score and gradient and repeat the loop described above until the score and gradient of the generated Dubin's curve is within acceptable parameters. Once the acceptable Dubin's curve is generated, the Dubin's curve can be used as the first phase trajectory and the second phase trajectory. The first and second phase trajectories generated by the lane change control module 200 can be used by lower level components of the host vehicle VA to sample a series of reference points for trajectory tracking and for controlling the host vehicle VA to intercept the reference points and thereby intercept the first target position TP1 in the adjacent lane.

In another example embodiment, the lane change control module 200 can obtain the vehicle state information, the host vehicle speed profile information, and the first target position TP1 (e.g., the target end position) as described above. In this example embodiment, the lane change control module 200 can generate the first and second phase trajectories by fitting a spline. As well known, a spline refers to a piecewise polynomial parametric curve. Splines can be used to approximate a curved trajectory from the host vehicle's current position to the first target position TP1 (e.g., the target end position). The splines generated by this example embodiment can be used as the first phase trajectory and the second phase trajectory. The first and second phase trajectories generated by the lane change control module 200 can be used by lower level components of the host vehicle VA to sample a series of reference points for trajectory tracking and for controlling the host vehicle VA to intercept the reference points and thereby intercept the first target position TP1 in the adjacent lane.

In yet another example embodiment, the lane change control module 200 can fit a piecewise linear speed trajectory function, which can be configured to satisfy the constraints of the initial host vehicle VA state, the initial states of the proximate vehicles (V1, V2, and V3), the goal state of the host vehicle VA, and the configuration of the controller of the host vehicle VA with optional optimizations on various cost functions (e.g., time, fuel consumption, etc.). In a particular embodiment, the piecewise linear speed trajectory function can be implemented using two uniform acceleration values, one for each of the first and second phase trajectories. As described above, one input to the piecewise linear speed trajectory function can be time t. An output of the piecewise linear speed trajectory function can be the desired state of the host vehicle VA at time t. As described above, the state of the host vehicle VA and the states of the proximate vehicles (V1, V2, and V3) can include the current position/location and heading of each vehicle and the related derivatives including velocity and acceleration of each vehicle. The first phase trajectory and the second phase trajectory generated by the piecewise linear speed trajectory function can be used by lower level components of the host vehicle VA to sample a series of reference points for trajectory tracking and for controlling the host vehicle VA to the intercept the reference points. The use of a piecewise linear speed trajectory function can considered to produce a higher level of jerk associated with the motion of the host vehicle VA through the first phase trajectory and the second phase trajectory. As such, the use of a piecewise linear speed trajectory function may produce a less comfortable and less gentle ride for host vehicle VA passengers. However, the use of a piecewise linear speed trajectory function can generate the first phase trajectory and the second phase trajectory more quickly and thus may require less computing power and/or processing time.

Figure 5:
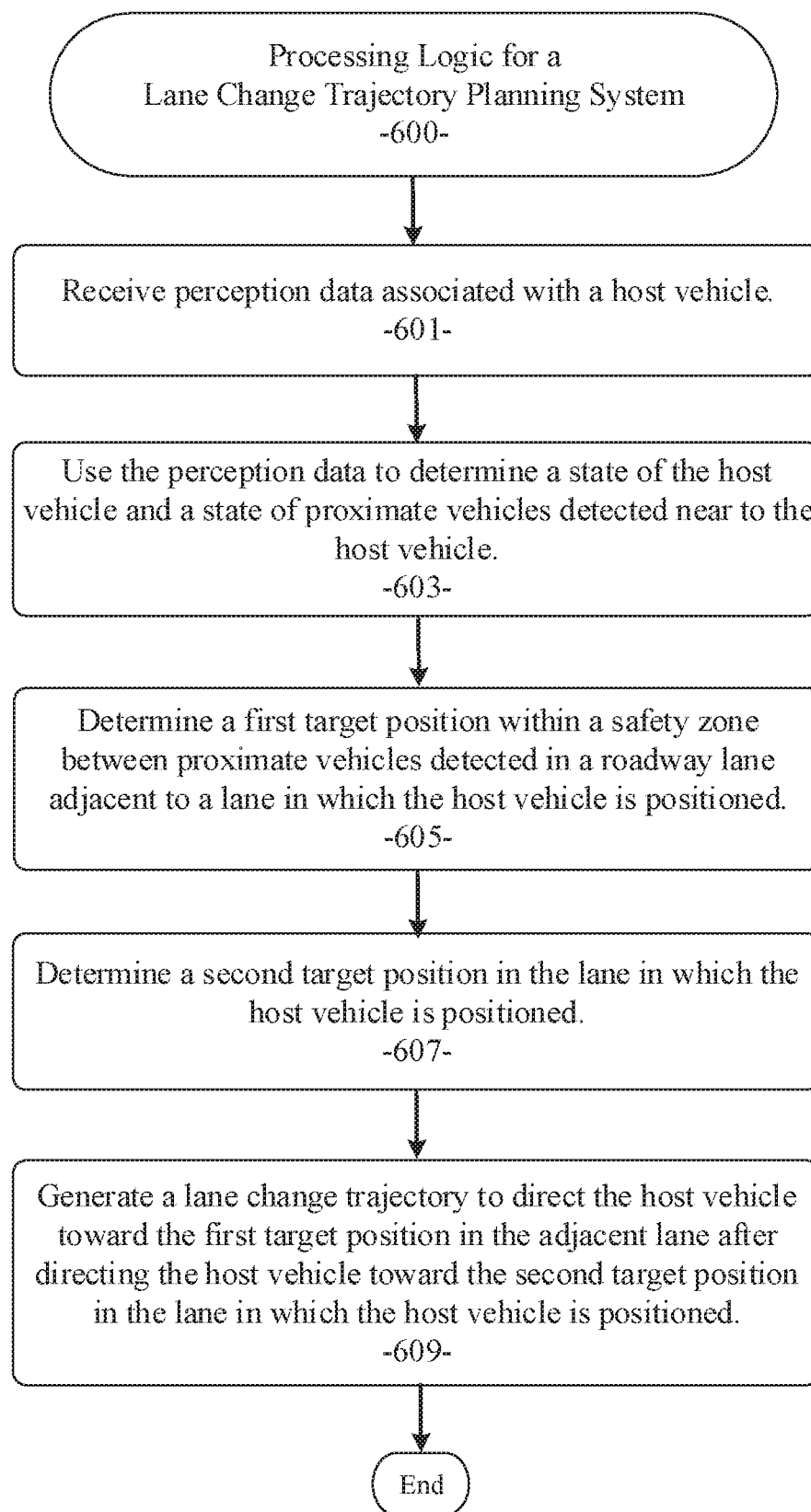
FIG. 5 is a process flow diagram illustrating an example embodiment of a system and method for automated lane change control for autonomous vehicles.

Referring now to FIG. 5, a flow diagram illustrates an example embodiment of a system and method 600 for providing lane change trajectory planning for autonomous vehicles. The example embodiment can be configured to: receive perception data associated with a host vehicle (processing block 601); use the perception data to determine a state of the host vehicle and a state of proximate vehicles detected near to the host vehicle (processing block 603); determine a first target position within a safety zone between proximate vehicles detected in a roadway lane adjacent to a lane in which the host vehicle is positioned (processing block 605); determine a second target position in the lane in which the host vehicle is positioned (processing block 607); and generate a lane change trajectory to direct the host vehicle toward the first target position in the adjacent lane after directing the host vehicle toward the second target position in the lane in which the host vehicle is positioned (processing block 609).

As used herein and unless specified otherwise, the term "mobile device" includes any computing or communications device that can communicate with the in-vehicle control system 150 and/or the lane change control module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150 and/or the lane change control module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the lane change control module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the lane change control module 200 can be implemented using systems that enhance the security of the execution environment, thereby improving security and reducing the possibility that the in-vehicle control system 150 and/or the lane change control module 200 and the related services could be compromised by viruses or malware. For example, the in-vehicle control system 150 and/or the lane change control module 200 can be implemented using a Trusted Execution Environment, which can ensure that sensitive data is stored, processed, and communicated in a secure way.

Figure 6:
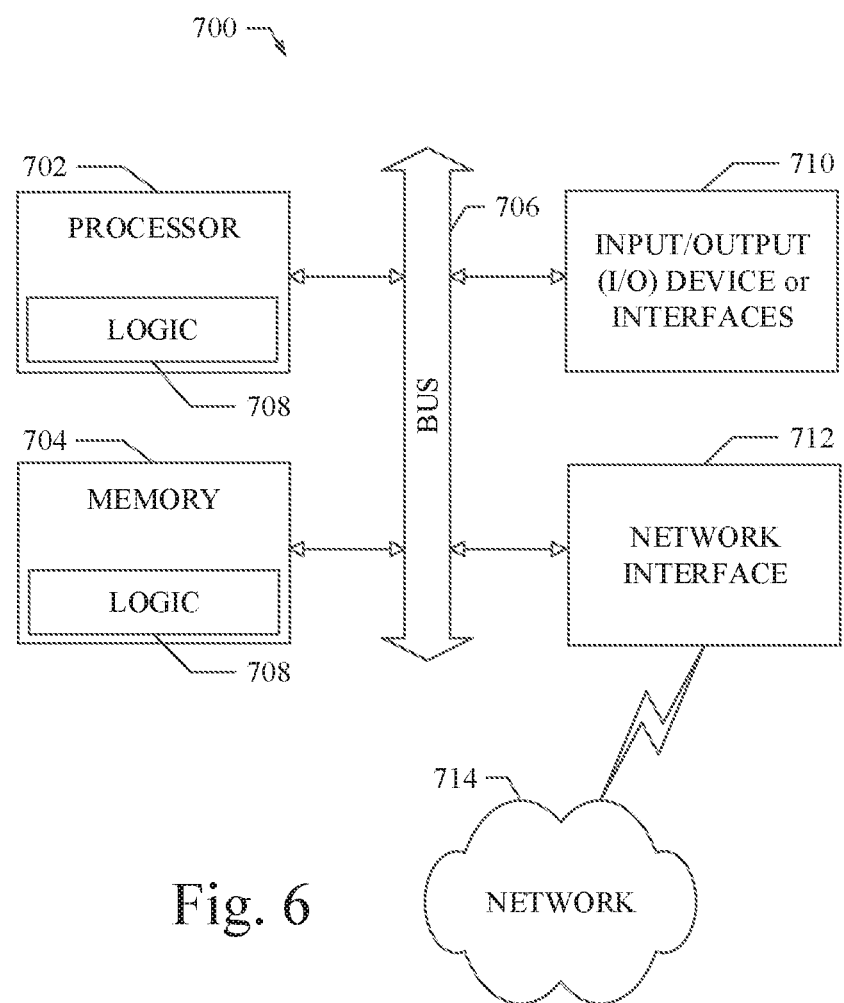
FIG. 6 shows a diagrammatic representation of machine in the example form of a computer system within which a set of instructions when executed may cause the machine to perform any one or more of the methodologies discussed herein.

FIG. 6 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   a data processor; and
   a lane change control module, executable by the data processor, the lane change control module being configured to perform a lane change trajectory planning operation for autonomous vehicles, wherein the lane change trajectory planning operation comprises:
   receiving perception data associated with a host vehicle, the perception data comprising data received from one or more vehicle sensor subsystems, the one or more vehicle sensor subsystems comprising at least one of:
   an image capture device or
   a laser range finder;
   using the perception data to determine a state of the host vehicle and a state of proximate vehicles detected near to the host vehicle;
   determining a first target position within a safety zone between proximate vehicles detected in a roadway lane adjacent to a lane in which the host vehicle is positioned;

determining a second target position in the lane in which the host vehicle is positioned;
generating a lane change trajectory to direct the host vehicle toward the first target position in the adjacent lane after directing the host vehicle toward the second target position in the lane in which the host vehicle is positioned;
determining a gradient of the lane change trajectory; and
comparing the gradient of the lane change trajectory with a speed profile of the host vehicle to determine if a curvature of the lane change trajectory is within the speed profile of the host vehicle.

2. The system of claim 1 wherein the one or more vehicle sensor subsystems comprises any of: a camera, an inertial measurement unit (IMU), a Global Positioning System (GPS) transceiver, a RADAR unit, or a LIDAR unit.

3. The system of claim 1 wherein the first target position is located at a midpoint within the safety zone.

4. The system of claim 2, wherein the one or more vehicle sensor subsystems comprises the laser range finder.

5. The system of claim 2, wherein the one or more vehicle sensor subsystems comprises the image capture device and the laser range finder.

6. The system of claim 2, wherein the one or more vehicle sensor subsystems comprises the image capture device.

7. The system of claim 1, wherein the lane change control module further comprises a longitudinal positioning module and a lateral steering module configured to receive the perception data, the perception data comprising at least one of: traffic image data, vehicle image data, roadway data, roadway lane marker data, environmental data, distance data from LIDAR devices, velocity data from LIDAR devices, acceleration data from LIDAR devices, and other sensor information received from the one or more vehicle sensor subsystems.

8. The system of claim 1 wherein the lane change trajectory for the host vehicle is generated by fitting a Dubin's curve.

9. A method comprising:
receiving perception data associated with a host vehicle, the perception data comprising data received from one or more vehicle sensor subsystems, the one or more vehicle sensor subsystems comprising at least one of:
an image capture device or
a laser range finder;
using the perception data to determine a state of the host vehicle and a state of proximate vehicles detected near to the host vehicle;
determining a first target position within a safety zone between proximate vehicles detected in a roadway lane adjacent to a lane in which the host vehicle is positioned;
determining a second target position in the lane in which the host vehicle is positioned;
generating a lane change trajectory to direct the host vehicle toward the first target position in the adjacent lane after directing the host vehicle toward the second target position in the lane in which the host vehicle is positioned;
determining a gradient of the lane change trajectory; and
comparing the gradient of the lane change trajectory with a speed profile of the host vehicle to determine if a curvature of the lane change trajectory is within the speed profile of the host vehicle.

10. The method of claim 9 wherein the perception data received from the one or more vehicle sensor subsystems further comprises any of: data from a camera, data from an inertial measurement unit (IMU), data from a Global Positioning System (GPS) transceiver, data from a RADAR unit, and image data comprising data processed to identify proximate agents or other objects.

11. The method of claim 9 including determining the safety zone, the safety zone being bounded by a safety distance from a leading proximate vehicle and a safety distance from a following proximate vehicle in the adjacent lane.

12. The method of claim 9, wherein the safety zone is determined based on safety distance parameters associated with each proximate vehicle, in which safety distance parameters are associated with a context of a proximate vehicle, the context comprising acceleration, deceleration, relative vehicle position with respect to the host vehicle, vehicle type, weather or environmental condition.

13. The method of claim 9, wherein directing the host vehicle toward the second target position in the lane in which the host vehicle is positioned comprises following a null trajectory.

14. The method of claim 9 including generating the lane change trajectory by fitting a spline.

15. The method of claim 9 including generating the lane change trajectory using a piecewise linear speed trajectory function.

16. The method of claim 9 wherein the lane change trajectory for the host vehicle is generated by fitting a Dubin's curve.

17. A non-transitory machine-useable storage medium embodying instructions which, when executed by a machine, cause the machine to:
receive perception data associated with a host vehicle, the perception data comprising data received from one or more vehicle sensor subsystems, the one or more vehicle sensor subsystems comprising at least one of:
an image capture device or
a laser range finder;
use the perception data to determine a state of the host vehicle and a state of proximate vehicles detected near to the host vehicle;
determine a first target position within a safety zone between proximate vehicles detected in a roadway lane adjacent to a lane in which the host vehicle is positioned;
determine a second target position in the lane in which the host vehicle is positioned;
generate a lane change trajectory to direct the host vehicle toward the first target position in the adjacent lane after directing the host vehicle toward the second target position in the lane in which the host vehicle is positioned;
determine a gradient of the lane change trajectory; and
compare the gradient of the lane change trajectory with a speed profile of the host vehicle to determine if a curvature of the lane change trajectory is within the speed profile of the host vehicle.

18. The non-transitory machine-useable storage medium of claim 17 wherein the instructions are further configured to generate the lane change trajectory by fitting a spline.

19. The non-transitory machine-useable storage medium of claim 17 being further configured to generate the lane change trajectory using a piecewise linear speed trajectory function.

20. The non-transitory machine-useable storage medium of claim 17 being further configured to generate the lane change trajectory by fitting a Dubin's curve.

* * * * *

UNITED STATES PATENT AND TRADEMARK OFFICE
CERTIFICATE OF CORRECTION

PATENT NO. : 10,953,881 B2
APPLICATION NO. : 15/946195
DATED : March 23, 2021
INVENTOR(S) : Kai-Chieh Ma et al.

Page 1 of 1

It is certified that error appears in the above-identified patent and that said Letters Patent is hereby corrected as shown below:

On the Title Page

On Page 4, in Item (56), under "OTHER PUBLICATIONS", in Column 2, Line 8, delete "Engineenng," and insert -- Engineering, --, therefor.

On Page 4, in Item (56), under "OTHER PUBLICATIONS", in Column 2, Line 10, delete "anknown" and insert -- unknown --, therefor.

In the Specification

In Column 7, Line 32, delete "an 02 monitor," and insert -- an O2 monitor, --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*